United States Patent
Zhang et al.

(10) Patent No.: US 10,558,357 B2
(45) Date of Patent: Feb. 11, 2020

(54) METHOD FOR RESPONDING TO TOUCH OPERATION AND ELECTRONIC DEVICE (71) Applicant: LENOVO (BEIJING) CO., LTD., Beijing (CN)

(72) Inventors: Xiaoping Zhang, Beijing (CN); Zhepeng Wang, Beijing (CN); Yaqiang Wu, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/025,114

(22) Filed: Jul. 2, 2018

(65) Prior Publication Data
US 2019/0004695 A1   Jan. 3, 2019

(30) Foreign Application Priority Data
Jun. 30, 2017 (CN) .......................... 2017 1 0530683

(51) Int. Cl.
*G06F 3/0488* (2013.01)
*G06F 3/041* (2006.01)

(52) U.S. Cl.
CPC ........ *G06F 3/04883* (2013.01); *G06F 3/0416* (2013.01); *G06F 2203/04104* (2013.01); *G06F 2203/04808* (2013.01)

(58) Field of Classification Search
CPC .............. G06F 3/04883; G06F 3/0416; G06F 2203/04104; G06F 2203/04808
See application file for complete search history.

(56) References Cited

U.S. PATENT DOCUMENTS

| 2012/0249470 | A1* | 10/2012 | Sugiura ................. G06F 1/1643 345/174 |
| 2014/0210747 | A1* | 7/2014 | Kim ..................... G06F 3/0487 345/173 |
| 2015/0009173 | A1* | 1/2015 | Rodzevski ............ G06F 3/0414 345/174 |
| 2015/0062069 | A1* | 3/2015 | Shin ....................... G06F 3/044 345/174 |
| 2015/0109220 | A1* | 4/2015 | Yliaho .................... G06F 3/016 345/173 |
| 2017/0351404 | A1* | 12/2017 | Liu ........................ G06F 3/048 |

FOREIGN PATENT DOCUMENTS

| CN | 103401999 A | 11/2013 |
| CN | 103513817 A | 1/2014 |
| CN | 103645835 A | 3/2014 |
| CN | 103902328 A | 7/2014 |

* cited by examiner

Primary Examiner — Christopher J Kohlman
(74) Attorney, Agent, or Firm — Anova Law Group, PLLC (57) ABSTRACT A method includes receiving data inputted via at least one touch point generated on a touch screen via a first touch mode of the touch screen, detecting whether the at least one touch point on the touch screen satisfies a preset condition, and, in response to the at least one touch point satisfying the preset condition, controlling the touch screen to switch from the first touch mode to a second touch mode. The second touch mode allows data input based on pressure generated on the touch screen.

17 Claims, 7 Drawing Sheets

S304
Under a situation in which the touch screen operates in the second touch mode, identifying a touch point with pressure out of the at least one touch point S305
Responding to the touch operation with respect to the touch point with pressure

METHOD FOR RESPONDING TO TOUCH OPERATION AND ELECTRONIC DEVICE

CROSS-REFERENCES TO RELATED APPLICATION

This application claims priority to Chinese Patent Application No. 201710530683.5, filed on Jun. 30, 2017, the entire contents of which are hereby incorporated by reference.

TECHNICAL FIELD

The present disclosure generally relates to the technical field of touch display and, more particularly, to a method and a system for responding to touch operations, and an electronic device.

BACKGROUND

As the technologies of electronics and touch screen develop continuously, more and more electronic devices tend to be equipped with a touch screen to implement various functions. For example, most smart cellphones, tablets, smart cameras, and personal computers now include a touch screen.

However, the conventional touch screen of the electronic device often has a single touch mode, which results in relatively poor user experience.

BRIEF SUMMARY OF THE DISCLOSURE

One aspect of the present disclosure provides a method including receiving data inputted via at least one touch point generated on a touch screen via a first touch mode of the touch screen, detecting whether the at least one touch point on the touch screen satisfies a preset condition, and, in response to the at least one touch point satisfying the preset condition, controlling the touch screen to switch from the first touch mode to a second touch mode. The second touch mode allows data input based on pressure generated on the touch screen.

Another aspect of the present disclosure provides an electronic device including a processor and a touch screen coupled to the processor. The touch screen is operative in a first touch mode to receive data inputted via at least one touch point generated on the screen. The processor is configured to detect whether the at least one touch point on the touch screen satisfies a preset condition and, in response to the at least one touch point satisfying the preset condition, control the touch screen to switch from the first touch mode to a second touch mode. The second touch mode allows data input based on pressure generated on the touch screen.

Other aspects of the present disclosure can be understood by those skilled in the art in light of the description, the claims, and the drawings of the present disclosure.

BRIEF DESCRIPTION OF THE DRAWINGS

In order to more clearly illustrate technical solutions in embodiments of the present disclosure, drawings for describing the embodiments are briefly introduced below. Obviously, the drawings described hereinafter are only some embodiments of the present disclosure, and it is possible for those ordinarily skilled in the art to derive other drawings from such drawings without creative effort.

DETAILED DESCRIPTION

Various solutions and features of the present disclosure will be described hereinafter with reference to the accompanying drawings. It should be understood that, various modifications may be made to the embodiments described below. Thus, the specification shall not be construed as limiting, but is to provide examples of the disclosed embodiments. Further, in the specification, descriptions of well-known structures and technologies are omitted to avoid obscuring concepts of the present disclosure.

The terminology used herein is for the purpose of describing specific embodiments and is not intended to be limiting of the present disclosure. As used herein, the singular forms "a," "an," and "the" are intended to include the plural forms as well, unless the context clearly indicates otherwise. Further, the terms "include," "including," "comprise," and "comprising" specify the present of the stated features, steps, operations, components and/or portions thereof, but do not exclude the possibility of the existence or adding one or more other features, steps, operations, components, and/ or portions thereof.

As used herein, the term "and/or" includes any and all combinations of one or more of the associated listed items.

Expression such as "at least one of" when preceding a list of elements may modify the entire list of elements and may not modify the individual elements of the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some block diagrams and/or flowcharts are provided in the accompanying drawings. It is understood that some blocks of the block diagrams and/or flowcharts, and combinations of blocks in the block diagrams and/or flowcharts, can be implemented by computer program instructions. These computer program instructions may be provided to a processor of a general purpose computer, special purpose computer, or other programmable data processing apparatus, such that the instructions, when being executed by the processor, may create devices for implementing functions/operations specified in the block diagrams and/or flowcharts.

Accordingly, technical solutions of the present disclosure may be implemented in the form of hardware and/or software (including firmware, micro-code, etc.). Furthermore, example embodiments may take the form of a computer program product on a computer-readable storage medium having computer-readable program code embodied in the medium for use by or in connection with an instruction execution system. In the context of present disclosure, a computer-usable or computer-readable medium may be any medium that can contain, store, communicate, propagate, or transport the program for use by or in connection with the instruction execution system, apparatus, or device.

The computer-readable storage medium may, for example, include but not limited to: an electronic, magnetic, optical, electromagnetic, infrared, or semiconductor system, apparatus, device, or propagation medium. Specific examples of the computer-readable storage medium may include: magnetic storage device, such as magnetic tape or hard drive disk (HDD); optical storage device, such as optical disk (CD-ROM); memory, such as random access memory (RAM) or flash drive; and/or wired or wireless communication links.

The present disclosure provides a method and a system for responding to touch operations. The method for responding to touch operations may be, for example, applied to an electronic device including a touch screen, where the touch mode of the touch screen includes at least a first touch mode and a second touch mode. The method may include: in response to at least one touch point generated on the touch screen satisfying a preset condition, controlling the touch screen of the electronic device to switch from the first touch mode to the second touch mode. The at least one touch point may be generated by a touch operation, such as a clicking operation that includes one or more quick clicks.

Figure 1:
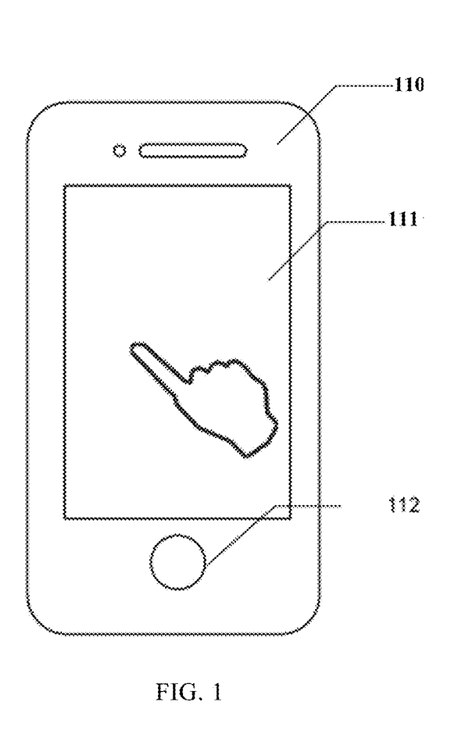
FIG. 1 illustrates an example of an application scenario of a method or a system for responding to a touch operation in accordance with some embodiments of the present disclosure.

FIG. 1 illustrates an example of an application scenario of a method or a system for responding to a touch operation in accordance with some embodiments of the present disclosure. As shown in FIG. 1, an electronic device 110 include a touch screen 111 and a physical button 112. The electronic device 110 may be used for a method for responding to a touch operation and/or include a system for responding to a touch operation. The physical button 112 may be configured to allow the user to perform operations on the electronic device 110. For example, the physical button 112 may be configured to take a photo, power on the electronic device, etc.

The electronic device 110 may be any of the followings: smart cellphone, tablet, smart camera, personal computer, etc. However, the present disclosure is not limited thereto. The user may perform a touch operation on the touch screen 111 of the electronic device 110, and the electronic device 110 may detect the touch operation and execute a corresponding function.

In some embodiments, the electronic device does not include the physical button 112. That is, operations on the electronic device 110 may be implemented through the touch screen 111 and no physical button 112 is needed to realize corresponding operations.

In some embodiments, the electronic device 110 may include one or more buttons other than the physical button 112, such as a turn-off button and a volume key. For example, the turn-off button may be configured to turn off the electronic device 110, and the volume key may be configured to adjust the volume of the sound played by the electronic device 110.

The touch screen 111 may be configured to have at least a first touch mode and a second touch mode. The first touch mode and the second touch mode may be configured based on practical applications. For example, the first touch mode may be a default touch mode, and the second touch mode may be a touch mode specially designed for situations in which liquid covers the touch screen 111 or a portion thereof.

Figure 2:
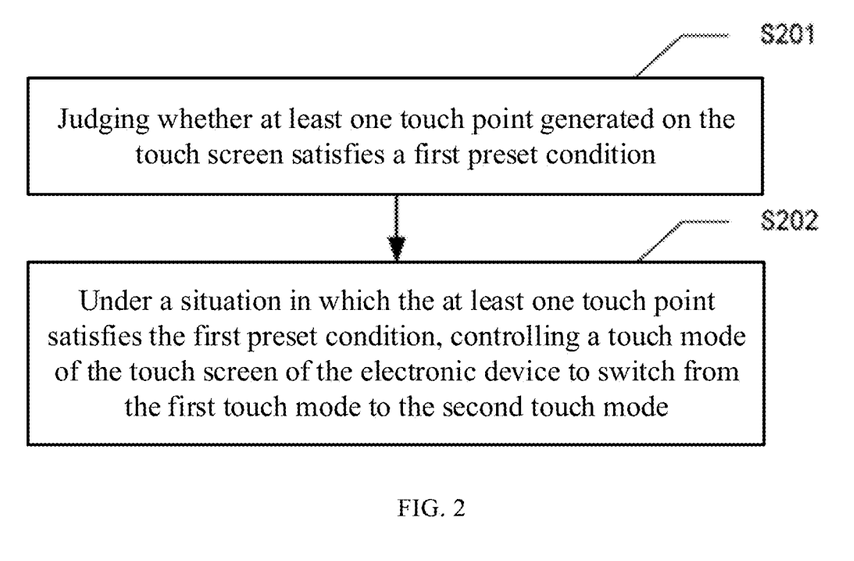
FIG. 2 illustrates a flow chart showing an example of a method for responding to a touch operation in accordance with some embodiments of the present disclosure.

FIG. 2 illustrates a flow chart showing an example of a method for responding to a touch operation in accordance with some embodiments of the present disclosure. The method for responding to a touch operation may be implemented in an electronic device including a touch screen, where the touch screen can operate under at least a first touch mode and a second touch mode. The method may include: judging whether at least one touch point generated on the touch screen satisfies a first preset condition; and when the at least one touch point satisfies the first preset condition, controlling a touch mode of the touch screen of the electronic device to switch from the first touch mode to the second touch mode. The at least one touch point may be generated by a touch operation.

As shown in FIG. 2, at S201, whether at least one touch point generated on a touch screen satisfies a first preset condition is detected. At S202, when the at least one touch point satisfies the first preset condition, the touch mode of the touch screen is switched from the first touch mode to the second touch mode. The second touch mode is different from the first touch mode. Further, the at least one touch point may be generated, for example, by a touch operation.

Operations S201 and S202 may be applied to an electronic device including a touch screen, where the touch screen is able to identify touch points generated on the touch screen. The touch screen may have at least the first touch mode and the second touch mode. That is, the types of the touch mode of the touch screen can be various. For example, the touch mode may be any one of the followings, or a combination thereof: capacitive touch mode, force touch mode, and resistive touch mode, etc. It should be noted that the disclosed touch screen may include other touch modes than the first touch mode and the second touch mode, and the touch mode supported by the touch screen is not limited by the present disclosure.

In some embodiments, after at least one touch point is generated on the touch screen, whether the at least one touch point satisfies a first preset condition is determined. In response to the at least one touch point satisfying the first preset condition, the touch mode of the electronic device is switched such that the touch screen of the electronic device can identify the operation of the user. The types of the first preset condition can be various. For example, the first preset condition may be any one of the following conditions or any combination thereof: the number of the at least one touch point reaches a preset number, a trajectory of the at least one touch point satisfies a preset trajectory, or a force (or pressure) on a touch point reaches a preset force (or pressure), etc.

According to the present disclosure, the at least one touch point generated on the touch screen may satisfy the first preset condition, and under such situation, the touch mode of the touch screen included in the electronic device may be switched from the first touch mode to the second touch mode. Such configuration, on one hand, allows the user to select the touch mode of the touch screen included in the electronic device based on the user's need; and on the other hand, allows the touch screen of the electronic device to better suit different application scenarios. For example, on a rainy day, the user may switch to use a touch mode suitable for operations on rainy days (e.g., in case rain drops fall on the touch screen), and on a sunny day, the user may switch to use a touch mode suitable for operations on sunny days.

Figure 3A:
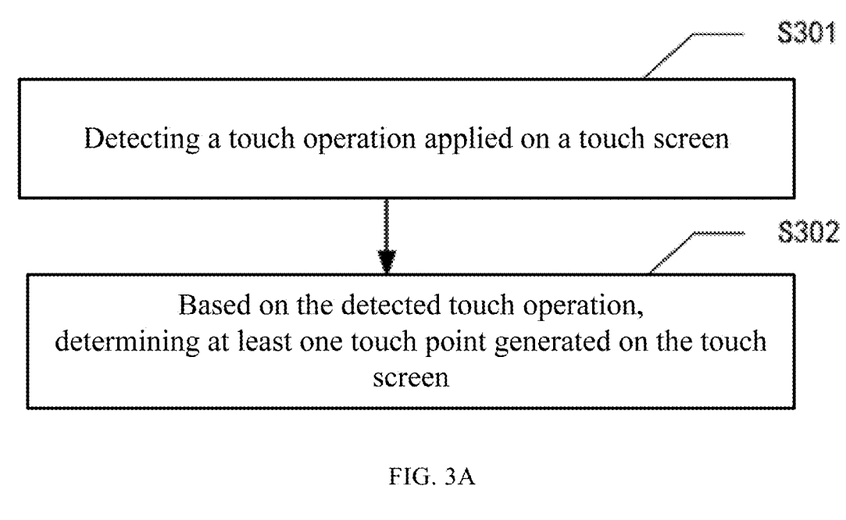
FIG. 3A illustrates a flow chart showing another example of a method for responding to a touch operation in accordance with some embodiments of the present disclosure.

Variations based on the method shown in FIG. 2 are provided hereinafter with reference to FIGS. 3A~3D. FIG. 3A illustrates a flow chart showing another example of a method for responding to a touch operation. As shown in FIG. 3A, in some embodiments, in addition to operations S201 and S202, the method for responding to a touch operation further includes operations S301 and S302. At S301, a touch operation on the touch screen is detected. At S302, based on the detected touch operation, at least one touch point generated on the touch screen is determined.

For example, before judging whether at least one touch point generated on a touch screen satisfies a first preset condition, the method for responding to a touch operation may include detecting a touch operation applied on a touch screen. The method may further include determining at least one touch point generated on the touch screen, based on the detected touch operation.

As such, before the touch mode of the touch screen of the electronic device is controlled to switch from the first touch mode to the second touch mode, the user may first perform a touch operation on the touch screen of the electronic device, and the electronic device may receive the touch operation applied by the user on the touch screen. The touch operation can be in various forms. For example, the touch operation may be a sliding operation on the touch screen, a long press on the touch screen, or a clicking operation on the touch screen, and the present disclosure is not limited thereto.

Further, after the touch operation applied on the touch screen is detected, the touch point generated by the touch operation applied on the touch screen may be determined based on the detected touch operation. For example, the position of each touch point, the force or pressure applied on each touch point, and/or the total number of touch points may be determined.

Further, before the touch mode of the touch screen of the electronic device is controlled to be switch from the first touch mode to the second touch mode, the touch operation on the touch screen is first detected, and hence corresponding touch point(s) can be detected. Based on whether the touch point(s) generated by the detected touch operation satisfy a preset condition, different options are provided. For example, when the touch point satisfies the preset condition, the touch mode of the touch screen of the electronic device is switched, and when the touch point does not satisfy the preset condition, the touch mode of the touch screen of the electronic device is not switched. Thus, whether to switch the touch mode of the touch screen of the electronic device can be determined based on the actual need of the user, which improves the user experience.

Figure 3B:
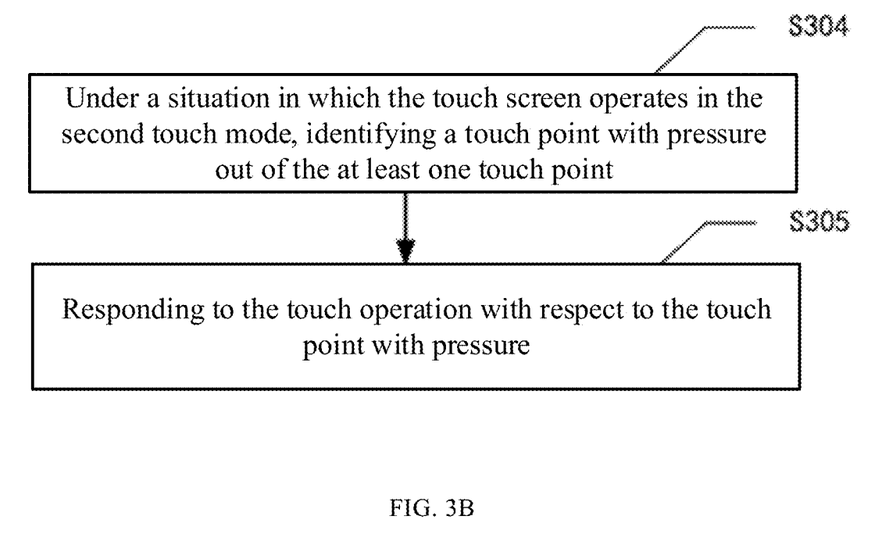
FIG. 3B illustrates a flow chart showing another example of a method for responding to a touch operation in accordance with some embodiments of the present disclosure.

FIG. 3B illustrates a flow chart showing another example of a method for responding to a touch operation. As shown in FIG. 3B, in some embodiment, om addition to operations described above in connection with FIG. 2 and FIG. 3A, the method for responding to a touch operation further includes operations S304 and S305. At S304, when the touch screen operates in the second touch mode, a touch point with pressure is identified out of the at least one touch point. The touch point with pressure is also referred to as a pressing touch point. At S305, the electronic device is configured to respond to the touch operation with respect to the touch point with pressure. Detailed illustrations of the operations in FIG. 2 and FIG. 3A are omitted here to avoid repeated descriptions.

For example, after the touch mode of the touch screen of the electronic device is switched from the first touch mode to the second touch mode, the touch screen of the electronic device operates in the second touch mode. The touch screen may identify a touch point with pressure generated by the touch operation, and after the touch point with pressure is identified, the electronic device may respond to the touch operation with respect to the touch point with pressure. The number of touch points identified by the touch screen may be one or more, or may be none. The approach of identifying a touch point with pressure may be, for example, detecting a touch point with a pressure exceeding a preset threshold.

As such, after the touch mode of the touch screen of the electronic device is switched, the electronic device may identify and respond to the touch operation that is generated on the touch screen before the touch mode of the touch screen is switched. The electronic device may further recognize and respond to a touch operation generated on the touch screen after the touch mode of the touch screen is switched. Accordingly, the touch screen of the electronic device may be applied to different application scenarios, which improves the user experience.

Figure 3C:
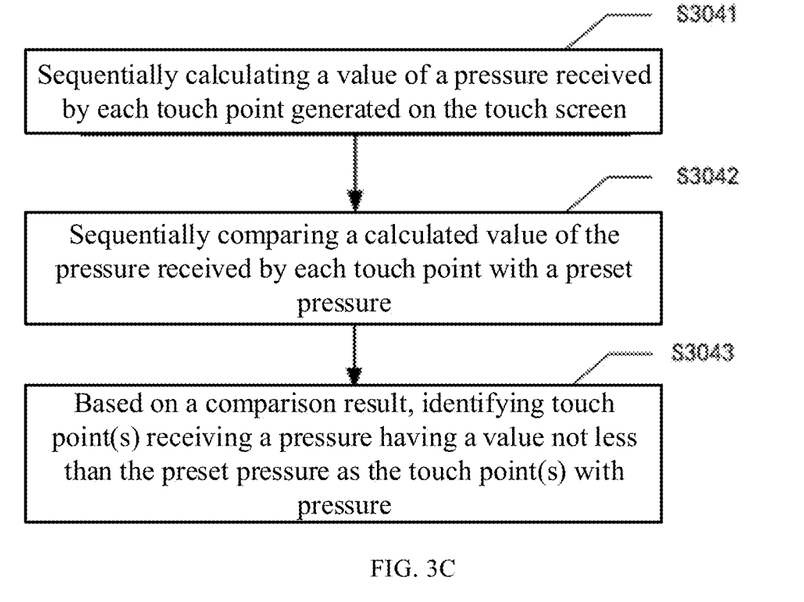
FIG. 3C illustrates a flow chart showing an example of identifying a touch point with pressure from at least one touch point in accordance with some embodiments of the present disclosure.

FIG. 3C illustrates a flow chart showing an example of identifying a touch point with pressure from at least one touch point. A shown in FIG. 3C, a method of identifying a touch point with pressure from at least one touch point may include operations S3041~S3043.

At S3041, a value of a pressure received by each touch point generated on the touch screen is calculated, for example, sequentially.

At S3042, a calculated value of the pressure received by each touch point is compared with a preset pressure, for example, sequentially.

At S3043, based on a comparison result, touch point(s) receiving a pressure having a value not less than the preset pressure are identified as the touch point(s) with pressure.

Thus, identifying a touch point with pressure out of the at least one touch point may include: sequentially calculating a value of a pressure received by each touch point generated on the touch screen; sequentially comparing a calculated value of the pressure received by each touch point with a preset pressure; and based on a comparison result, identifying touch point(s) receiving a pressure having a value not less than the preset pressure as the touch point(s) with pressure. The number of the identified touch point may be one or more, and the present disclosure is not limited thereto.

As such, the method for identifying a touch point with pressure from a plurality of touch points may include calculating a value of a pressure of each touch point generated on the touch screen, comparing the calculated value of the pressure corresponding to each touch point with a preset pressure to obtain a comparison result, and identifying the touch point(s) with calculated value of pressure greater than or equal to the preset pressure as touch point(s) with pressure. Further, the touch point with a calculated pressure less than the preset pressure may be neglected.

The method of comparing the pressure on each touch point with the preset pressure to identify a touch point with pressure from a plurality of touch points is relatively easy and convenient, which may identify the touch point(s) with pressure in a relatively short period of time.

Figure 3D:
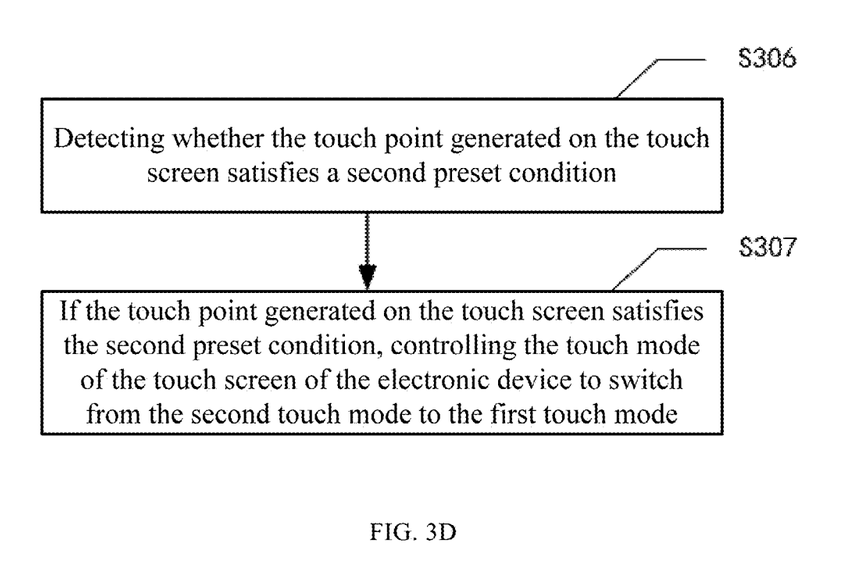
FIG. 3D illustrates a flow chart showing another example of a method for responding to a touch operation in accordance with some embodiments of the present disclosure.

FIG. 3D illustrates a flow chart showing another example of a method for responding to a touch operation. As shown in FIG. 3D, the method may further include S306 and S307. At S306, whether the touch point generated on the touch screen satisfies a second preset condition is detected. The touch point for determining whether the second preset condition is satisfied can be, for example, the same or different from the touch point for determining whether the first preset condition is satisfied. At S307, if the touch point generated on the touch screen satisfies the second preset condition, the touch mode of the touch screen of the electronic device is switched from the second touch mode to the first touch mode.

For example, after the touch mode of the touch screen of the electronic device is switched from the first touch mode to the second touch mode, whether the touch point generated on the touch screen satisfies the second preset condition is detected. If the touch point generated on the touch screen satisfies the second preset condition, the touch mode of the touch screen of the electronic device is switched from the second touch mode to the first touch mode. The second preset condition may be, for example, an underwater touch mode. When the electronic device is used in water, or when a liquid layer covers the touch screen of the electronic device or a portion thereof, the underwater touch mode may be desired by the user to prevent the liquid from affecting the user's operation on the touch screen.

As such, after the touch mode of the touch screen of the electronic device is switched from the first touch mode to the second touch mode, whether the touch point generated on the touch screen satisfies the second preset condition is detected. In response to the touch point generated on the touch screen satisfying the second preset condition, the touch mode of the touch screen of the electronic device is switched from the second touch mode to the first touch mode. Thus, the touch mode of the touch screen included in the electronic device may be conveniently switched, and the user may select a desired touch mode based on actual need.

In some embodiments, judging whether the at least one touch point generated on the touch screen satisfies the first preset condition includes detecting whether the number of touch points is greater than or equal to a preset number. For example, when the number of the touch points is greater than or equal to the preset number, the touch mode of the touch screen of the electronic device may be switched from the first touch mode to the second touch mode. When the number of the touch points is less than the preset number, the touch mode of the touch screen of the electronic device may remain unchanged. Thus, the user may rapidly and conveniently switch the touch mode of the touch screen.

In some embodiments, in response to detection of the touch operation applied on the touch screen, the touch screen of the electronic device may be configured in a default touch mode. For example, when no switching of touch mode is desired or needed, the touch screen of the electronic device may be configured in the default touch mode. The default touch mode may be configured based on user preference or user habit to improve the user experience.

In some embodiments, in response to detection of the touch operation applied on the touch screen, a control may be displayed on the touch screen of the electronic device for the user to select the first touch mode or the second touch mode. In one embodiment, the second touch mode may be an underwater touch mode. When the electronic device works underwater or a liquid spreads over the touch screen of the electronic device, the electronic device may configure the touch mode of the touch screen based on the external environment of the touch screen. Accordingly, the liquid may not affect the touch screen in identifying user's operations.

As such, to intelligently control and switch the touch mode of the touch screen, at least a control for selecting the first touch mode or the second touch mode may be displayed on the touch screen of the electronic device, and the user may select the touch mode of the touch screen based on actual situations.

Figure 4:
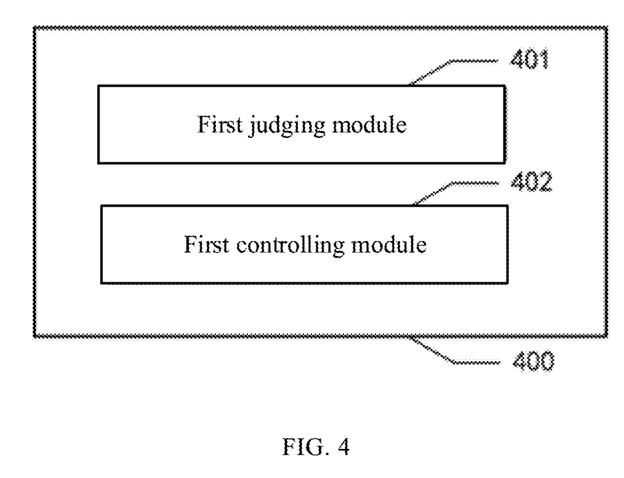
FIG. 4 illustrates a block diagram showing an example of a system for responding to a touch operation in accordance with some embodiments of the present disclosure.

FIG. 4 illustrates a block diagram showing an example of a system for responding to a touch operation in accordance with some embodiments of the present disclosure. As shown in FIG. 4, the system 400 for responding to a touch operation includes a first judging module 401 and a first controlling module 402. The system 400 may be applied to an electronic device including a touch screen, and the touch screen may operate under one of at least a first touch mode and a second touch mode.

The first judging module 401 may be configured to detect whether the at least one touch point generated on a touch screen satisfies a first preset condition. The at least one touch point may be generated by a touch operation. The first controlling module 402 may be configured to switch the touch mode of the touch screen from the first touch mode to the second touch mode when the at least one touch point satisfies the first preset condition.

According to the present disclosure, the at least on touch point generated on the touch screen may satisfy the first preset condition, and under such situation, the touch mode of the touch screen included in the electronic device may be switched from the first touch mode to the second touch mode. Such configuration, on one hand, allows the user to select the touch mode of the touch screen included in the electronic device based on the user's need; and, on the other hand, allows the touch screen of the electronic device better suitable for different application scenarios. For example, in a rainy day, the user may switch to use a touch mode suitable for operations in rainy days, and in a sunny day, the user may switch to use a touch mode suitable for operations in sunny days.

Figure 5A:
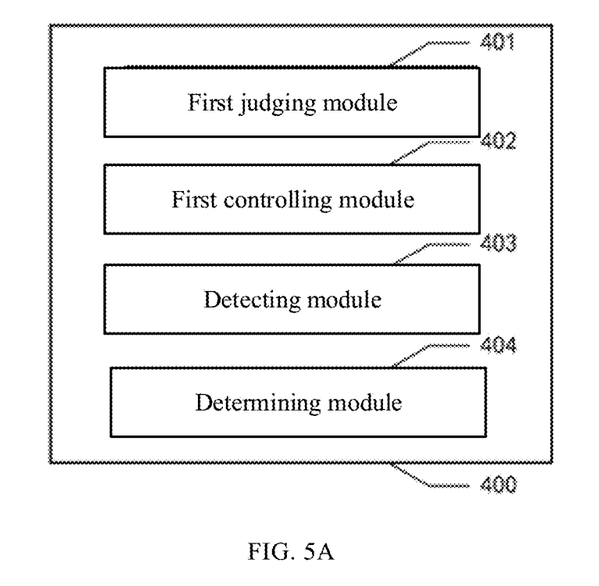
FIG. 5A illustrates a block diagram showing another example of a system for responding to a touch operation in accordance with some embodiments of the present disclosure.

FIG. 5A illustrates a block diagram showing another example of a system for responding to a touch operation in accordance with some embodiments of the present disclosure. As shown in FIG. 5A, the system 400 for responding to a touch operation includes the first judging module 401, the first controlling module 402, a detecting module 403, and a determining module 404.

The detecting module 403 may be configured to detect a touch operation on the touch screen before the first judging module 401 detects whether at least one touch point generated on a touch screen satisfies a first preset condition. The determining module 404 may be configured to, based on the detected touch operation, determine at least one touch point generated on the touch screen.

Figure 5B:
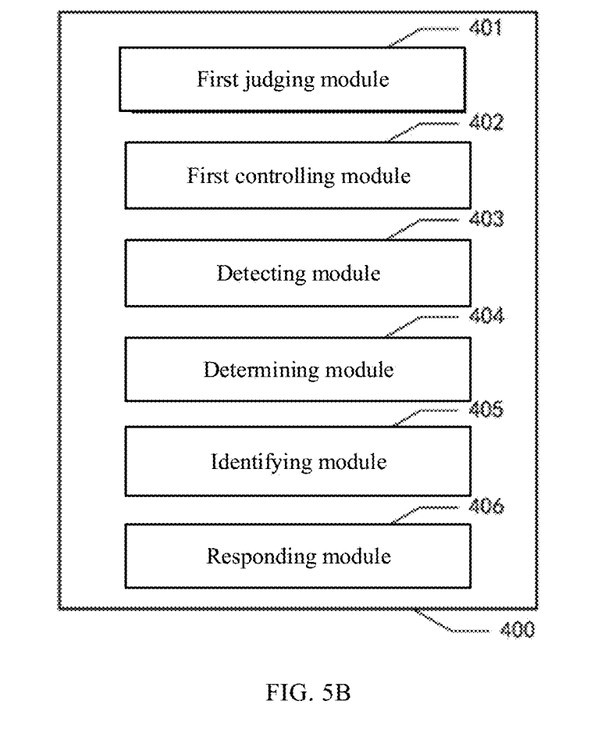
FIG. 5B illustrates a block diagram showing another example of a system for responding to a touch operation in accordance with some embodiments of the present disclosure.

FIG. 5B illustrates a block diagram showing another example of a system for responding to a touch operation in accordance with some embodiments of the present disclosure. As shown in FIG. 5B, the system 400 for responding to a touch operation includes the first judging module 401, the first controlling module 402, the detecting module 403, the determining module 404, an identifying module 405, and a responding module 406.

The identifying module 405 may be configured to identify a touch point with pressure out of the at least one touch point when the touch screen operates in the second touch mode. The responding module 406 may be configured to enable the electronic device to respond to the touch operation with respect to the touch point with pressure.

Figure 5C:
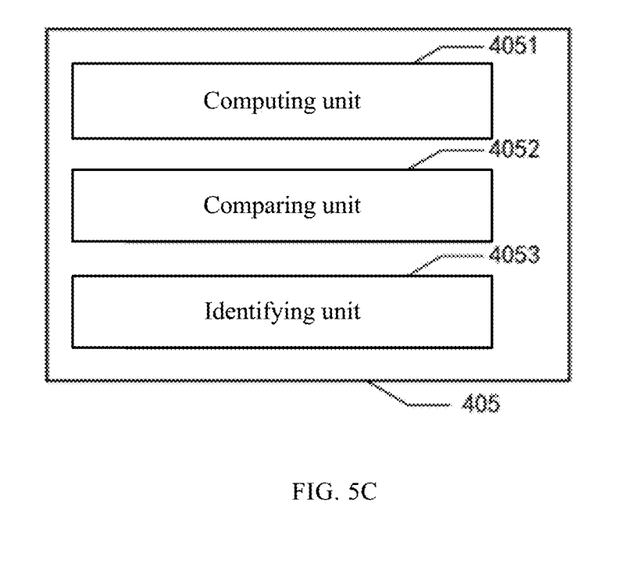
FIG. 5C illustrates a block diagram showing a identifying module in accordance with some embodiments of the present disclosure.

FIG. 5C illustrates a block diagram showing an example of the identifying module 405 in accordance with some embodiments of the present disclosure. As shown in FIG. 5C, the identifying module 405 includes a computing unit 4051, a comparing unit 4052, and an identifying unit 4053. The computing unit 4051 may be configured for sequentially calculating a value of a pressure received by each touch point generated on the touch screen. The comparing unit 4052 may be configured for sequentially comparing a calculated value of the pressure received by each touch point with a preset pressure. The identifying unit 4053 may be configured for, based on a comparison result, identifying touch point(s) receiving a pressure having a value not less than the preset pressure as the touch point(s) with pressure.

Figure 5D:
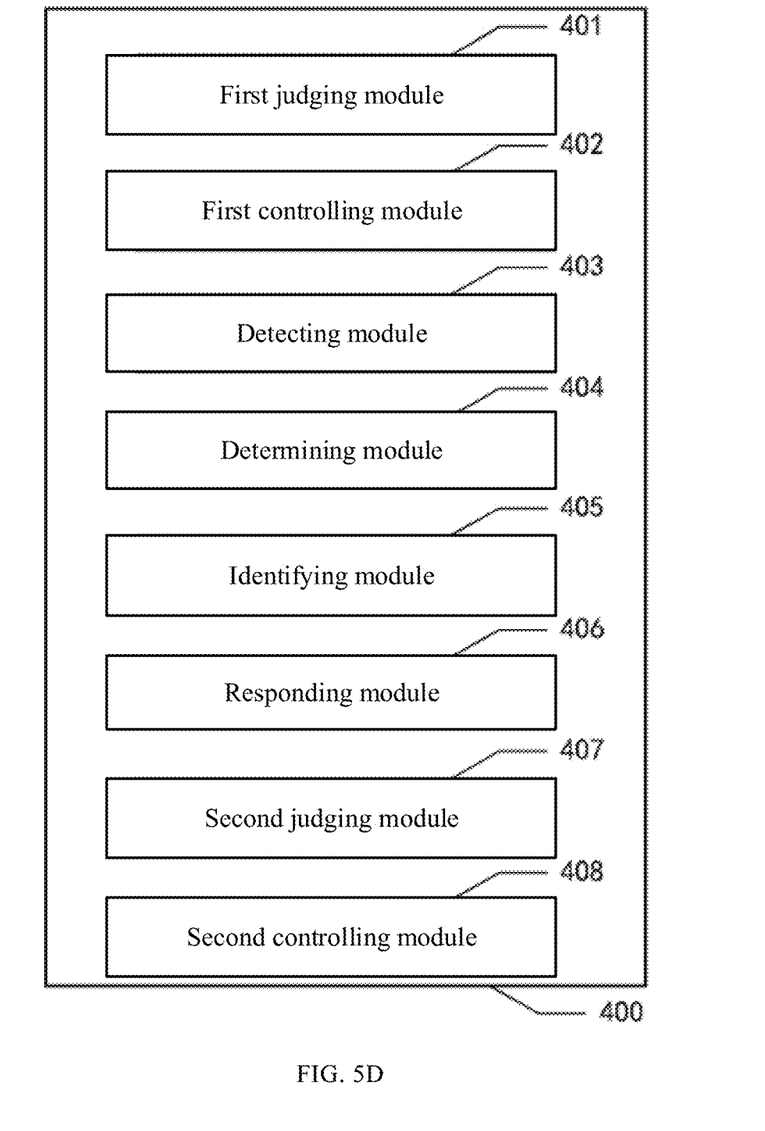
FIG. 5D illustrates a block diagram showing another example of a system for responding to a touch operation in accordance with some embodiments of the present disclosure.

FIG. 5D illustrates a block diagram showing another example of a system for responding to a touch operation in accordance with some embodiments of the present disclosure. As shown in FIG. 5D, the system 400 for responding to a touch operation may include the first judging module 401, the first controlling module 402, the detecting module 403, the determining module 404, the identifying module 405, the responding module 406, a second judging module 407, and a second controlling module 408.

The second judging module 407 may be configured to, after the touch mode of the touch screen of the electronic device is switched from the first touch mode to the second touch mode, detect whether the touch point generated on the touch screen satisfies the second preset condition. The second controlling module 408 may be configured to, if the touch point generated on the touch screen satisfies the second preset condition, switch the touch mode of the touch screen of the electronic device from the second touch mode to the first touch mode.

In some embodiments, the first judging module 401 may be configured to determine whether the number of touch points is greater than or equal to a preset number.

In some embodiments, the system 400 for responding to a touch operation may display a control on the touch screen of the electronic device for the user to select the first touch mode or the second touch mode. The second touch mode may be, for example, an underwater touch mode.

In some embodiments, the first judging module 401, the first controlling module 402, the detecting module 403, and the determining module 404, the identifying module 405, the responding module 406, the second judging module 407, and the second controlling module 408 may be implemented in one module, or any of the aforementioned modules may be divided into a plurality of sub-modules. In some embodiments, functions of one or more of the aforementioned modules may be combined with at least a part of functions of other modules for implementation in one module.

In some embodiments, at least one of the first judging module 401, the first controlling module 402, the detecting module 403, and the determining module 404, the identifying module 405, the responding module 406, the second judging module 407, and the second controlling module 408 may be at least partially implemented as hardware circuit. The hardware circuit may be, for example, a field-programmable gate array (FPGA), programmable logic array (PLA), system on chip (SOC), system on the substrate, system on encapsulation, application-specific integrated circuit (ASIC).

In some embodiments, at least one of the first judging module 401, the first controlling module 402, the detecting module 403, and the determining module 404, the identifying module 405, the responding module 406, the second judging module 407, and the second controlling module 408 may be implemented using hardware or firmware configured to integrate or encapsulate the circuit in any other appropriate manner, or may be implemented in an appropriate combination of any two or more of software, hardware, and firmware.

In some embodiments, at least one of the first judging module 401, the first controlling module 402, the detecting module 403, and the determining module 404, the identifying module 405, the responding module 406, the second judging module 407, and the second controlling module 408 may be at least partially implemented as computer program modules, and when instructions run on the computer, the at least one module may execute functions of corresponding modules.

The present disclosure further provides an electronic device to which the aforementioned method may be applied. The electronic device may include a memory and a processor. The memory stores programs, and the processor is configured to execute the programs stored in the memory to realize any of the aforementioned method. The electronic device may further include a touch screen, and the touch screen may at least include a first touch mode and a second touch mode.

Figure 6:
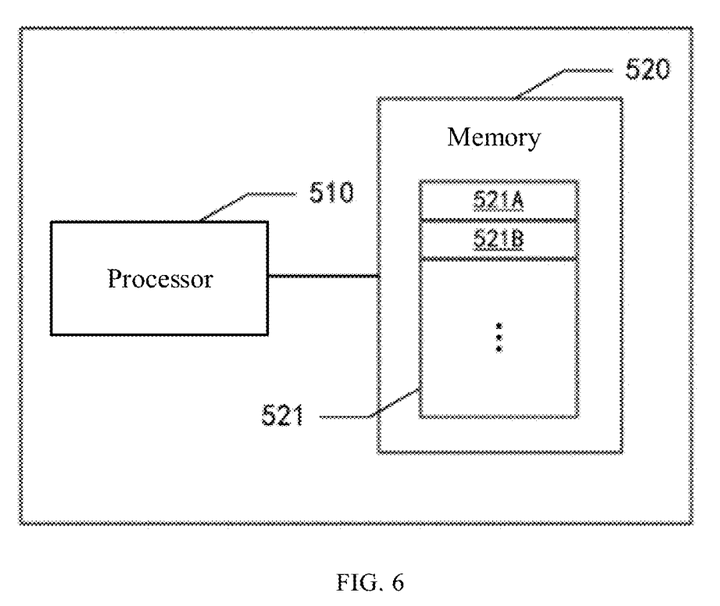
FIG. 6 illustrates a block diagram showing an example of an electronic device for responding to a touch operation in accordance with some embodiments of the present disclosure.

For example, FIG. 6 illustrates a block diagram showing an example of an electronic device for responding to a touch operation in accordance with some embodiments of the present disclosure. As shown in FIG. 6, the electronic device includes a processor 510 and a memory 520. The memory 520 includes a computer program 521, and the computer program 521 may be configured to implement one or more program modules, such as a program module 521A and a program module 521B. Such electronic device may execute a method consistent with the disclosure, such as one of the example methods described above with reference to FIG. 2 to FIG. 3D.

The processor 510 may include, for example, a general micro-processor, an instruction set processor, and/or a related chip group, and/or a specialized microprocessor such as an application-specific integrated circuit (ASIC). The processor 510 may further include an onboard memory for caching purposes. The processor 510 may be a single processing unit or include plural processing units for executing different actions or operations described above in connection with the flowcharts shown in FIG. 2~FIG. 3D.

The memory 520 may be any medium for containing, storing, communicating, propagating, or transporting the programs. For example, the memory may include but not limited to: an electronic, magnetic, optical, electromagnetic, infrared, or semiconductor system, apparatus, device, or propagation medium. Specific examples of the computer-readable storage medium may include: magnetic storage device, such as magnetic tape or hard drive disk (HDD); optical storage device, such as optical disk (CD-ROM); memory, such as random access memory (RAM) or flash drive; and/or wired or wireless communication links.

The computer program 521 included in the memory 520 may include codes/computer-executable instructions. The codes or the computer-executable instructions may be executed by the processor 510 to implement a method consistent with the disclosure, such as one of the example methods described above with reference to FIG. 2~FIG. 3D, or any method variation thereof.

In some embodiments, the computer program 521 may be configured to include computer program codes for implementing computer program modules. For example, the codes of the computer program 521 may be configured to implement one or more program modules, such as the program module 521A and the program module 521B. It should be noted that the divisional method and the number of the modules are not fixed, and those skilled in the relevant art may use appropriate program modules or combinations thereof based on actual situations. When the program modules or combinations thereof are executed by the processor 510, the processor 510 may execute a method consistent with the disclosure, such as one of the example methods described above in connection with FIG. 2~FIG. 3D, or any variation thereof.

In some embodiments, at least one of the first judging module 401, the first controlling module 402, the detecting module 403, and the determining module 404, the identifying module 405, the responding module 406, the second judging module 407, and the second controlling module 408 may be implemented as computer program module(s) described with reference to FIG. 6. When the computer program module(s) are executed by the processor 510, the corresponding operations described above may be implemented.

Although the present disclosure is illustrated and described with reference to example embodiments of the present disclosure, those skilled in the relevant art should understand that, without departing from appended claims and the spirit and scope of the present disclosure defined equivalently, various changes may be made to the present disclosure in the manner and detail. It is intended that the specification and examples be considered as illustrative only and not to limit the scope of the disclosure, with a true scope and spirit of the invention being indicated by the following claims.

What is claimed is:

1. A method comprising:
   receiving data input via at least one first touch point generated on a touch screen via a first touch mode of the touch screen;
   detecting whether the at least one first touch point on the touch screen satisfies a preset condition, the preset condition including a trajectory of the at least one first touch point satisfying a preset trajectory; and
   in response to detecting that the at least one first touch point satisfies the preset condition, controlling the touch screen to switch from the first touch mode to a second touch mode to obtain data input based on pressure generated on the touch screen;
   receiving data input via at least one second touch point generated on the touch screen via the second touch mode of the touch screen; and
   identifying and responding to, in the second touch mode, touch operations corresponding to touch points based on pressure received at the touch points, the touch points including both the at least one first touch point and the at least one second touch point, and the touch operations including both a first touch operation corresponding to the at least one first touch point and a second touch operation corresponding to the at least one second touch point.

2. The method according to claim 1, further comprising, before detecting whether the at least one first touch point satisfies the preset condition:
   detecting a touch operation applied on the touch screen; and
   determining the at least one first touch point based on the touch operation.

3. The method according to claim 1, wherein identifying and responding to the touch operation includes:
   in response to the touch screen operating in the second touch mode, identifying a pressing touch point out of the at least one touch point; and
   responding to the touch operation with respect to the pressing touch point.

4. The method according to claim 3, wherein identifying the pressing touch point includes:
   calculating a pressure value at each of the at least one touch point;
   comparing the pressure value at the each of the at least one touch point with a preset pressure; and
   identifying one of the at least one touch point having the pressure value not less than the preset pressure as the pressing touch point.

5. The method according to claim 1,
   wherein the preset condition is a first preset condition,
   the method further comprising, after controlling the touch screen to switch from the first touch mode to the second touch mode:
   detecting whether the at least one second touch point generated on the touch screen satisfies a second preset condition; and
   in response to the at least one second touch point satisfying the second preset condition, controlling the touch screen to switch from the second touch mode to the first touch mode.

6. The method according to claim 5, the first preset condition is same as the second present condition.

7. The method according to claim 1, wherein detecting whether the at least one first touch point satisfies the preset condition includes:
   detecting whether a number of the at least one first touch point is greater than or equal to a preset number.

8. The method according to claim 1, wherein:
   the first touch mode is a default touch mode of the touch screen.

9. The method according to claim 1, further comprising:
   displaying a control on the touch screen for selecting the first touch mode or the second touch mode.

10. An electronic device comprising:
    a processor; and
    a touch screen coupled to the processor, the touch screen being operative in a first touch mode and a second touch mode;
    wherein the processor is configured to:
    receive data input via at least one first touch point generated on the touch screen in the first touch mode of the touch screen;

detect whether the at least one first touch point on the touch screen satisfies a preset condition, the preset condition including a trajectory of the at least one first touch point satisfying a preset trajectory; and in response to detecting that the at least one first touch point satisfies the preset condition, control the touch screen to switch from the first touch mode to the second touch mode to obtain data input based on pressure generated on the touch screen;

receive data input via at least one second touch point generated on the touch screen via the second touch mode of the touch screen; and identify and respond to, in the second touch mode, touch operations corresponding to touch points based on pressure received at the touch points, the touch points including both the at least one first touch point and the at least one second touch point, and the touch operations including both a first touch operation corresponding to the at least one first touch point and a second touch operation corresponding to the at least one second touch point.

11. The electronic device according to claim 10, wherein the processor is further configured to:

detect a touch operation applied on the touch screen; and determine the at least one first touch point based on the touch operation.

12. The electronic device according to claim 10, wherein to identify and respond to the touch operation, the processor is configured to:

in response to the touch screen operating in the second touch mode, identify a pressing touch point out of the at least one touch point; and respond to the touch operation with respect to the pressing touch point.

13. The electronic device according to claim 12, wherein the processor is further configured to:

calculate a pressure value at each of the at least one touch point;

compare the pressure value at the each of the at least one touch point with a preset pressure; and identify one of the at least one touch point having the pressure value not less than the preset pressure as the pressing touch point.

14. The electronic device according to claim 10, wherein:

the preset condition is a first preset condition, and the processor is further configured to, after controlling the touch screen to switch from the first touch mode to the second touch mode:

detect whether the at least one second touch point generated on the touch screen satisfies a second preset condition; and in response to the the at least one second touch point satisfying the second preset condition, control the touch screen to switch from the second touch mode to the first touch mode.

15. A method comprising:

detecting at least one first touch point generated by a first touch operation applied on a touch screen in a first touch mode of the touch screen;

receiving data inputted via the at least one first touch point generated on the touch screen;

detecting whether the at least one first touch point on the touch screen satisfies a preset condition, the preset condition including a number of the at least one first touch point generated by the first touch operation applied on the touch screen being equal to or greater than a preset number; and in response to detecting that the at least one first touch point satisfies the preset condition, controlling the touch screen to switch from the first touch mode to a second touch mode to obtain data input based on pressure generated on the touch screen;

receiving data input via at least one second touch point generated on the touch screen via the second touch mode of the touch screen; and identifying and responding to, in the second touch mode, touch operations corresponding to touch points based on a pressure received at the touch points, the touch points including both the at least one first touch point and the at least one second touch point, and the touch operations including both the first touch operation corresponding to the at least one first touch point and a second touch operation corresponding to the at least one second touch point.

16. The method according to claim 15, wherein the preset condition is a first preset condition, the method further comprising, after controlling the touch screen to switch from the first touch mode to the second touch mode:

detecting whether the at least one second touch point generated on the touch screen satisfies a second preset condition; and in response to the at least one second touch point satisfying the second preset condition, controlling the touch screen to switch from the second touch mode to the first touch mode.

17. The method according to claim 16, the first preset condition is same as the second preset condition.

* * * * *